(12) United States Patent
Sharma et al.

(10) Patent No.: US 12,376,054 B2
(45) Date of Patent: Jul. 29, 2025

(54) SYNCHRONIZATION SIGNAL BLOCK INDEX DETECTION

(71) Applicant: QUALCOMM Incorporated, San Diego, CA (US)

(72) Inventors: Prashant Sharma, San Jose, CA (US); Jae Ho Ryu, San Diego, CA (US); Changhwan Park, San Diego, CA (US); Chu-Hsiang Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 18/067,376

(22) Filed: Dec. 16, 2022

(65) Prior Publication Data

US 2023/0262626 A1   Aug. 17, 2023

Related U.S. Application Data

(60) Provisional application No. 63/267,889, filed on Feb. 11, 2022.

(51) Int. Cl.
*H04W 56/00*   (2009.01)

(52) U.S. Cl.
CPC .............. *H04W 56/0015* (2013.01)

(58) Field of Classification Search
CPC .................. H04W 56/0015; H04W 56/001
See application file for complete search history.

(56) References Cited

U.S. PATENT DOCUMENTS

| | | | |
|---|---|---|---|
| 11,627,552 B1* | 4/2023 | Kaikkonen | H04W 68/025 455/458 |
| 2022/0217032 A1* | 7/2022 | Ko | H04B 7/2656 |

* cited by examiner

*Primary Examiner* — Ayanah S George
(74) *Attorney, Agent, or Firm* — Guang Y. Zhang; Harrity & Harrity, LLP

(57) ABSTRACT

Various aspects of the present disclosure generally relate to wireless communication. In some aspects, a user equipment (UE) may receive a synchronization signal block (SSB) offset indication that indicates a maximum timing offset between an SSB index of a first cell and an SSB index of a second cell. The UE may perform SSB index detection based at least in part on the SSB offset indication. Numerous other aspects are described.

30 Claims, 11 Drawing Sheets

FIG. 5

500

SYNCHRONIZATION SIGNAL BLOCK INDEX DETECTION

CROSS-REFERENCE TO RELATED APPLICATION

This Patent Application claims priority to U.S. Provisional Patent Application No. 63/267,889, filed on Feb. 11, 2022, entitled "SYNCHRONIZATION SIGNAL BLOCK INDEX DETECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization signal block index detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a synchronization signal block (SSB) offset indication that indicates a maximum timing offset between an SSB index of a first cell and an SSB index of a second cell. The method may include performing SSB index detection based at least in part on the SSB offset indication.

Some aspects described herein relate to a method of wireless communication performed by a network node. The method may include generating a SSB offset indication that indicates a maximum timing offset between an SSB index of a first cell and an SSB index of a second cell. The method may include transmitting, to a UE, the SSB offset indication.

Some aspects described herein relate to an apparatus for wireless communication performed by a UE. The apparatus may include a memory and one or more processors, coupled to the memory. The one or more processors may be configured to receive a SSB offset indication that indicates a maximum timing offset between an SSB index of a first cell and an SSB index of a second cell. The one or more processors may be configured to perform SSB index detection based at least in part on the SSB offset indication.

Some aspects described herein relate to an apparatus for wireless communication performed by a network node. The apparatus may include a memory and one or more processors, coupled to the memory. The one or more processors may be configured to generate a SSB offset indication that indicates a maximum timing offset between an SSB index of a first cell and an SSB index of a second cell. The one or more processors may be configured to transmit, to a UE, the SSB offset indication.

Some aspects described herein relate to a non-transitory computer-readable medium that stores a set of instructions for wireless communication by a UE. The set of instructions, when executed by one or more processors of the UE, may cause the UE to receive a SSB offset indication that indicates a maximum timing offset between an SSB index of a first cell and an SSB index of a second cell. The set of instructions, when executed by one or more processors of the UE, may cause the UE to perform SSB index detection based at least in part on the SSB offset indication.

Some aspects described herein relate to a non-transitory computer-readable medium that stores a set of instructions for wireless communication by a network node. The set of instructions, when executed by one or more processors of the network node, may cause the network node to generate a SSB offset indication that indicates a maximum timing offset between an SSB index of a first cell and an SSB index of a second cell. The set of instructions, when executed by one or more processors of the network node, may cause the network node to transmit, to a UE, the SSB offset indication.

Some aspects described herein relate to an apparatus for wireless communication. The apparatus may include means for receiving a SSB offset indication that indicates a maximum timing offset between an SSB index of a first cell and an SSB index of a second cell. The apparatus may include means for performing SSB index detection based at least in part on the SSB offset indication.

Some aspects described herein relate to an apparatus for wireless communication. The apparatus may include means for generating a SSB offset indication that indicates a maximum timing offset between an SSB index of a first cell and an SSB index of a second cell. The apparatus may include means for transmitting, to a UE, the SSB offset indication.

Aspects generally include a method, apparatus, system, computer program product, non-transitory computer-readable medium, user equipment, base station, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of synchronization signal block (SSB) pattern for high sub-carrier spacing, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
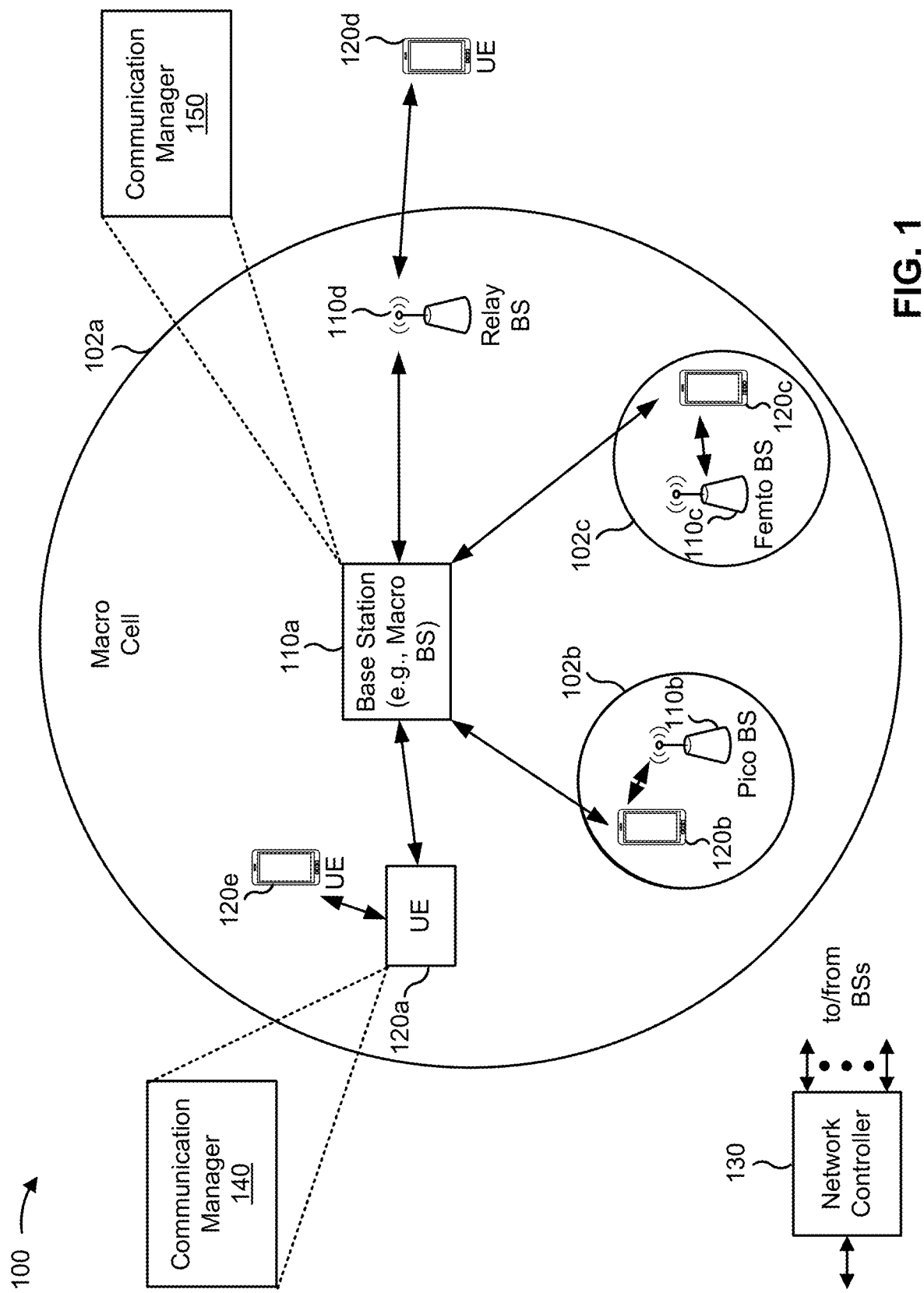
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) offset indication that indicates a maximum timing offset between an SSB index of a first cell and an SSB index of a second cell; and perform SSB index detection based at least in part on the SSB offset indication. Additionally, or alternatively, the communication manager 140 may perform one or more other operations described herein.

In some aspects, the network node (e.g., network node 605) may include a communication manager 150. As described in more detail elsewhere herein, the communication manager 150 may generate an SSB offset indication that indicates a maximum timing offset between an SSB index of a first cell and an SSB index of a second cell; and transmit, to the UE 120, the SSB offset indication. Additionally, or alternatively, the communication manager 150 may perform one or more other operations described herein.

As indicated above, FIG. 1 is provided as an example. Other examples may differ from what is described with regard to FIG. 1.

Figure 2:
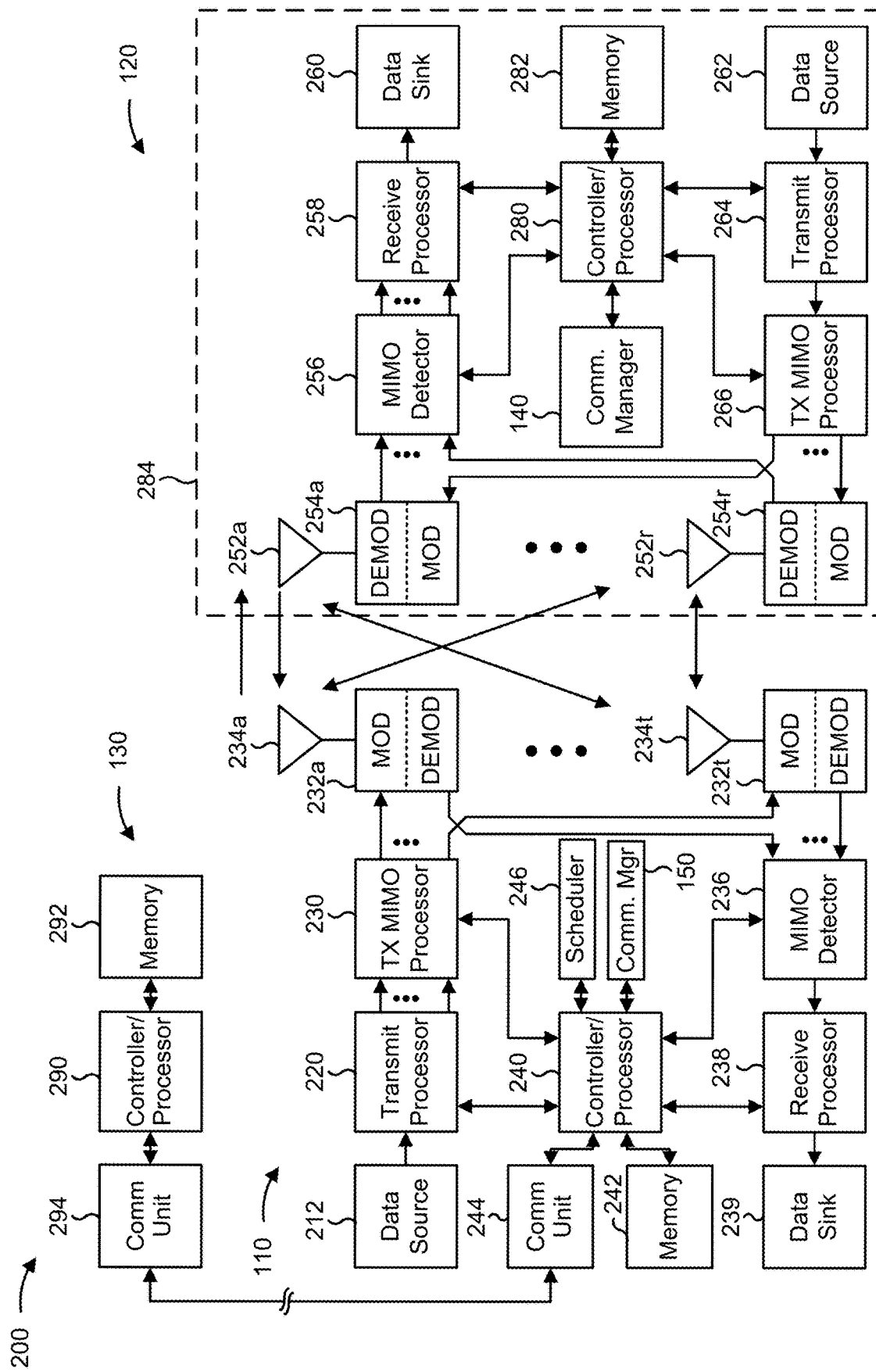
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-11).

The controller/processor 240 of the base station 110, the controller/processor 280 of the UE 120, and/or any other component(s) of FIG. 2 may perform one or more techniques associated with SSB index detection, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving an SSB offset indication that indicates a maximum timing offset between an SSB index of a first cell and an SSB index of a second cell; and/or means for performing SSB index detection based at least in part on the SSB offset indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 605 includes means for generating an SSB offset indication that indicates a maximum timing offset between an SSB index of a first cell and an SSB index of a second cell; and/or means for transmitting, to the UE 120, the SSB offset indication. In some aspects, the means for the network node 605 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
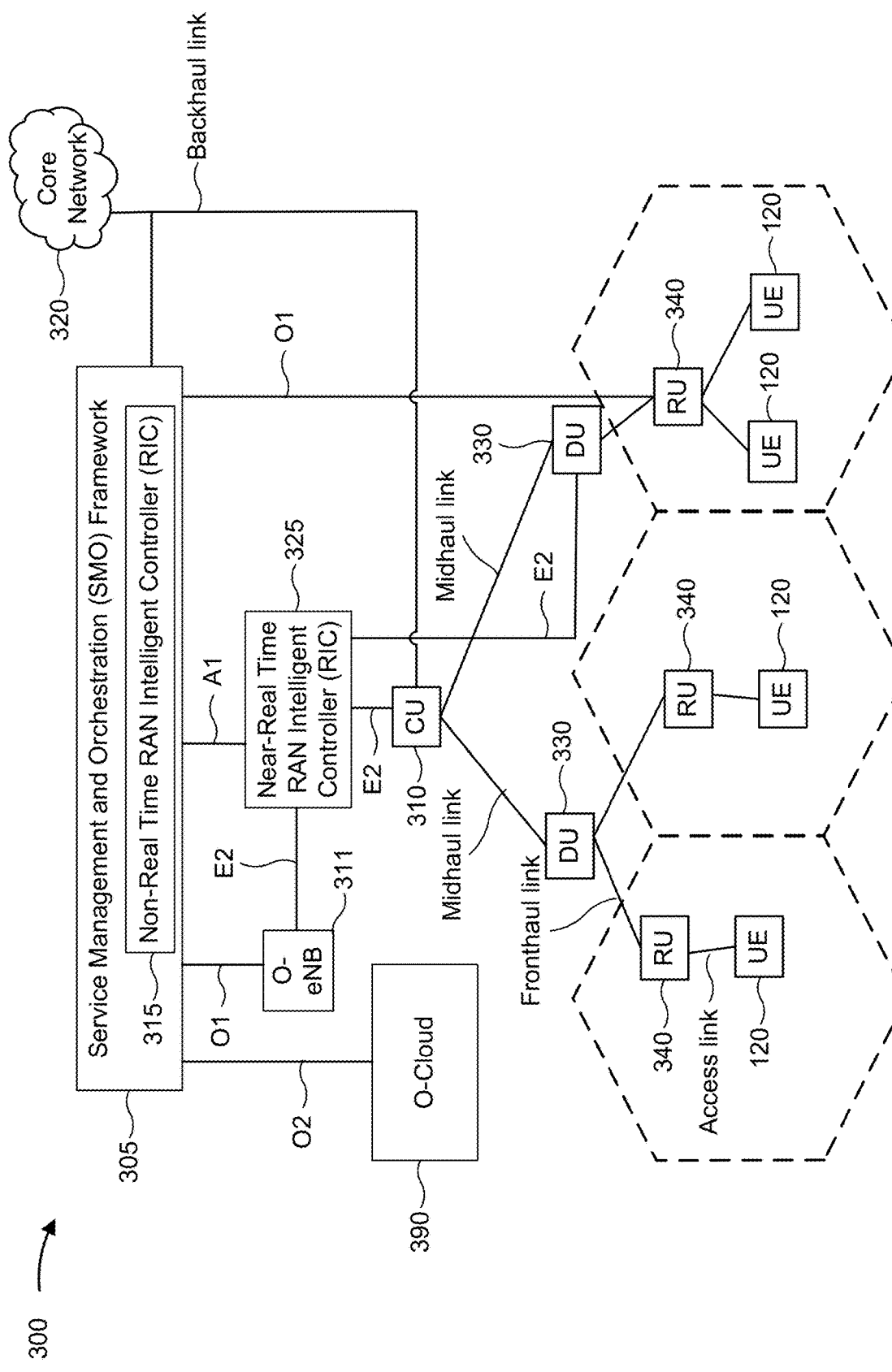
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
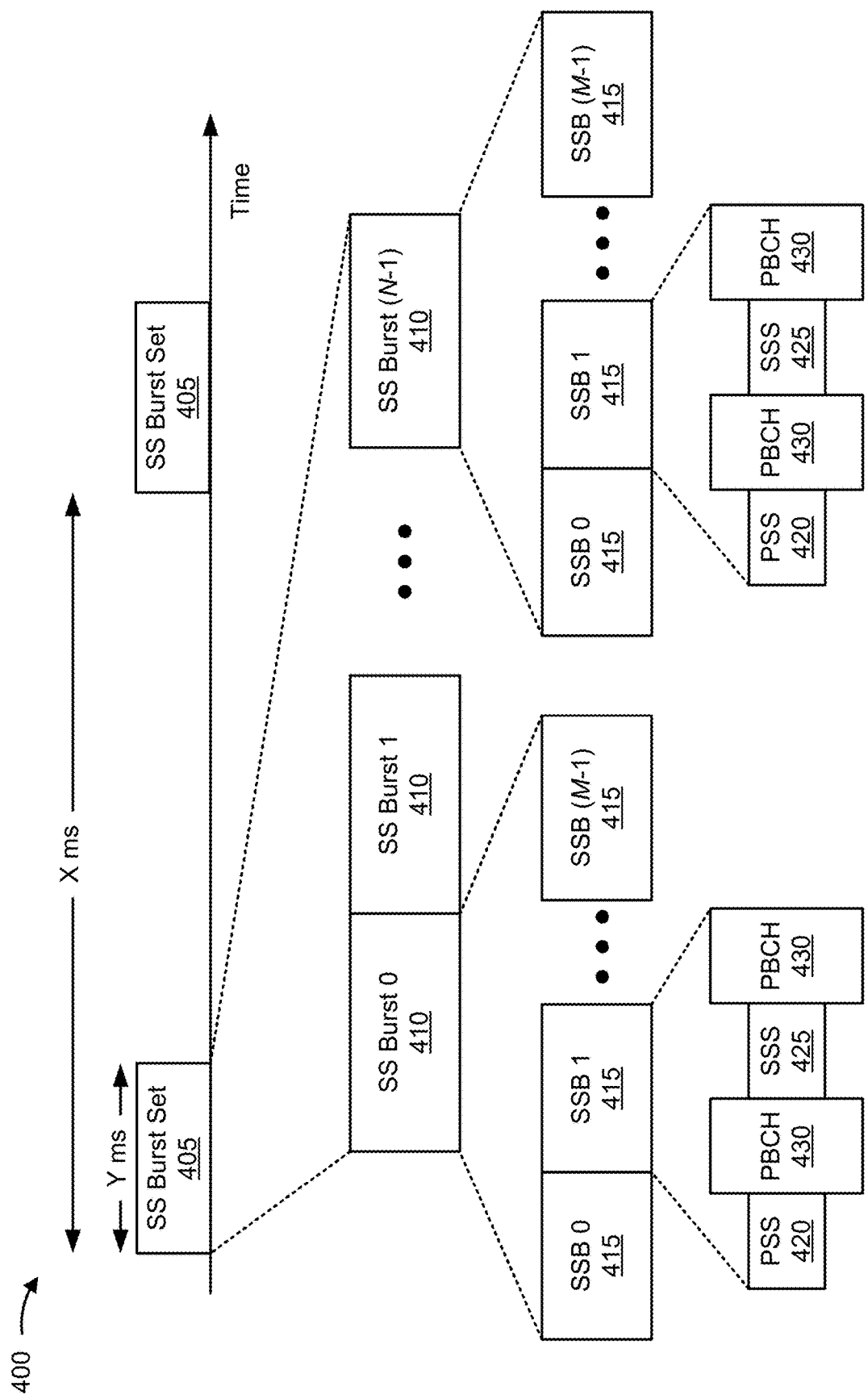
FIG. 4 is a diagram illustrating an example of a synchronization signal hierarchy, in accordance with the present disclosure.

FIG. 4 is a diagram illustrating an example 400 of a synchronization signal (SS) hierarchy, in accordance with the present disclosure. As shown in FIG. 4, the SS hierarchy may include an SS burst set 405, which may include multiple SS bursts 410, shown as SS burst 0 through SS burst N−1, where N is a maximum number of repetitions of the SS burst 410 that may be transmitted by the base station. As further shown, each SS burst 410 may include one or more SSBs 415, shown as SSB 0 through SSB M−1, where M is a maximum number of SSBs 415 that can be carried by an SS burst 410. In some aspects, different SSBs 415 may be beam-formed differently (e.g., transmitted using different beams), and may be used for cell search, cell acquisition, beam management, and/or beam selection (e.g., as part of an initial network access procedure). An SS burst set 405 may be periodically transmitted by a wireless node (e.g., base station 110), such as every X milliseconds, as shown in FIG. 4. In some aspects, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some aspects, an SSB 415 may include resources that carry a PSS 420, an SSS 425, and/or a physical broadcast channel (PBCH) 430. In some aspects, multiple SSBs 415 are included in an SS burst 410 (e.g., with transmission on different beams), and the PSS 420, the SSS 425, and/or the PBCH 430 may be the same across each SSB 415 of the SS burst 410. In some aspects, a single SSB 415 may be included in an SS burst 410. In some aspects, the SSB 415 may be at least four symbols (e.g., OFDM symbols) in length, where each symbol carries one or more of the PSS 420 (e.g., occupying one symbol), the SSS 425 (e.g., occupying one symbol), and/or the PBCH 430 (e.g., occupying two symbols). In some aspects, an SSB 415 may be referred to as an SS/PBCH block.

In some aspects, the symbols of an SSB 415 are consecutive, as shown in FIG. 4. In some aspects, the symbols of an SSB 415 are non-consecutive. Similarly, in some aspects, one or more SSBs 415 of the SS burst 410 may be transmitted in consecutive radio resources (e.g., consecutive symbols) during one or more slots. Additionally, or alternatively, one or more SSBs 415 of the SS burst 410 may be transmitted in non-consecutive radio resources.

In some aspects, the SS bursts 410 may have a burst period, and the SSBs 415 of the SS burst 410 may be transmitted by a wireless node (e.g., base station 110) according to the burst period. In this case, the SSBs 415 may be repeated during each SS burst 410. In some aspects, the SS burst set 405 may have a burst set periodicity, whereby the SS bursts 410 of the SS burst set 405 are transmitted by the wireless node according to the fixed burst set periodicity. In other words, the SS bursts 410 may be repeated during each SS burst set 405.

In some aspects, an SSB 415 may include an SSB index, which may correspond to a beam used to carry the SSB 415. A UE 120 may monitor for and/or measure SSBs 415 using different receive (Rx) beams during an initial network access procedure and/or a cell search procedure, among other examples. Based at least in part on the monitoring and/or measuring, the UE 120 may indicate one or more SSBs 415 with a best signal parameter (e.g., an RSRP parameter) to a base station 110. The base station 110 and the UE 120 may use the one or more indicated SSBs 415 to select one or more beams to be used for communication between the base station 110 and the UE 120 (e.g., for a random access channel (RACH) procedure). Additionally, or alternatively, the UE 120 may use the SSB 415 and/or the SSB index to determine a cell timing for a cell via which the SSB 415 is received (e.g., a serving cell).

As described in more detail below, an SSB synchronization indicator may be used to signal time synchronization of neighbor cells. However, it may not always be possible to use the SSB synchronization indicator, particularly when high sub-carrier spacing (SCS) is implemented.

As indicated above, FIG. 4 is provided as an example. Other examples may differ from what is described with regard to FIG. 4.

Figure 5:
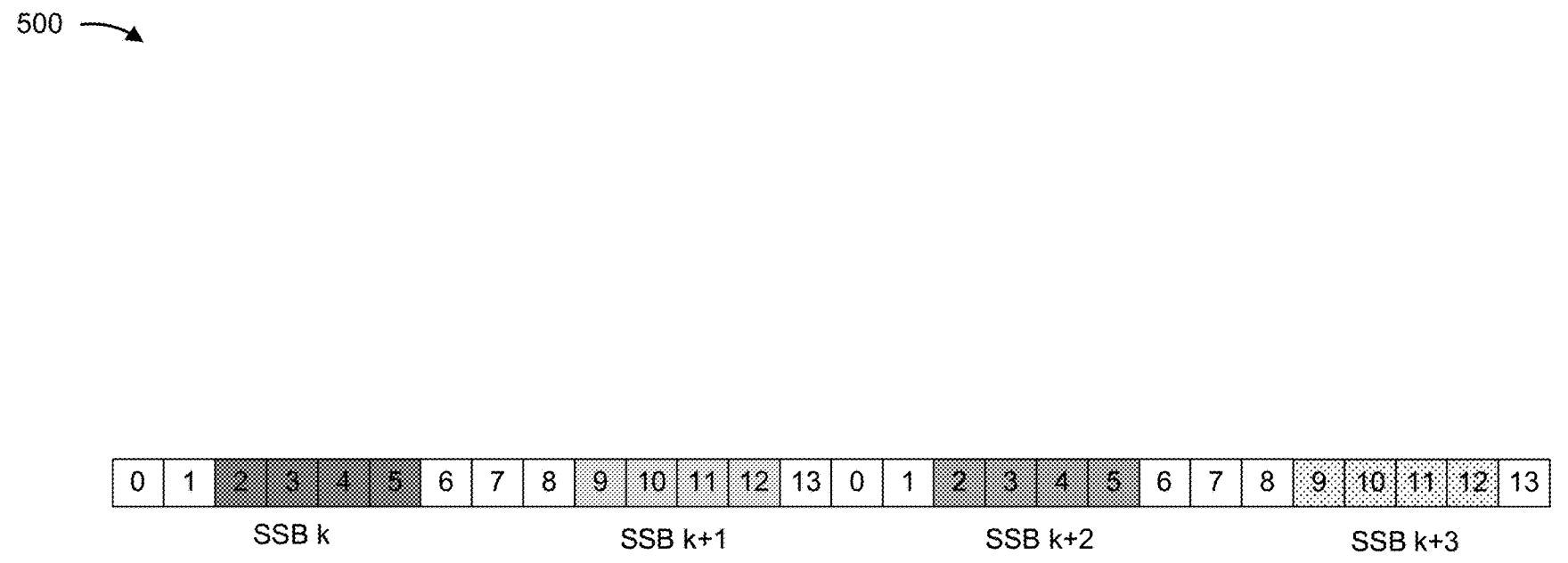

FIG. 5 is a diagram illustrating an example 500 of an SSB pattern for high SCS, in accordance with the present disclosure.

In some cases, an SSB synchronization indicator may be used to signal time synchronization of neighbor cells. For example, the SSB synchronization indicator deriveSSB-IndexFromCell may signal the time synchronization between a first cell and a second cell. In some cases, when deriveSSB-IndexFromCell is enabled, the UE 120 may assume that frame boundary alignment (e.g., including half-frame, subframe, and slot boundary alignment) across cells on the same frequency carrier is within a tolerance not worse than a minimum (e.g., 2 SSB symbols, 1 physical downlink shared channel (PDSCH) symbol), and that the system frame number (SFN) of all cells on the same frequency carrier are the same.

In some cases, for frequency range 1 (FR1) (e.g., 450 MHz-6000 MHz) time division duplexing (TDD) and FR2 (e.g., 24250 MHz-52600 MHZ), the deriveSSB-IndexFromCell signal may assume to always be enabled. This is possible as the synchronization error (e.g., network phase synchronization (3 microseconds (μs)) plus propagation delay difference) is well contained within 2 SSB symbols for SCS less than or equal to 240 kHz. For FR2, the SSB index may be determined by PBCH DMRS detection and master information block (MIB) decoding.

In some cases, enabling deriveSSB-IndexFromCell implies that the UE 120 can assume frame synchronization between a serving cell and a neighbor cell, and does not need to detect the SSB index of the neighbor cell during radio resource management (RRM) measurements.

In some cases (e.g., as described in Release 17 of the 3GPP specifications), the NR extension to 71 gHz (FR2-2) specifies high SCS for data and SSB. In some cases, the high SCS for data and SSB may be 480 kHz or 960 kHz, among other examples. For 480 kHz, the OFDM symbol length may be 2.226 μs. For 960 kHz, the OFDM symbol length may be 1.113 μs. An example of the SSB pattern for the SCS is shown in the example 400. For example, SSB k may occupy symbols 2, 3, 4, and 5 of a first slot, SSB k+1 may occupy symbols 9, 10, 11, and 12 of the first slot, SSB k+2 may occupy symbols 2, 3, 4, and 5 of a second slot, and SSB k+3 may occupy symbols 9, 10, 11, and 12 of the second slot.

In some cases, assuming a typical cell size for the SCS to be around 1 kilometer (km), the propagation delay difference between neighboring cells may be around 3 μs, and the cell phase synchronization between the cells may be around 3 μs. In some cases, the time synchronization error may be greater than 3 SSB symbols (e.g., for 960 kHz SCS). For example, the 3 SSB symbols may have a length of 3.339 μs, while the synchronization error may be around 6 us total. This implies that the UE 120 may not be able to assume time synchronization to determine the SSB index of the intra-frequency neighbor cell using the serving cell SSB index. In some cases, this may also be true for the 480 kHz SCS (e.g., if the cell size is greater than 1 km). Thus, deriveSSB-IndexFromCell cannot always be enabled.

In some cases, when deriveSSB-IndexFromCell is not provided by the network, the UE 120 may need to determine the neighbor cell SSB index by decoding the PBCH. The PBCH decoding process may require DMRS sequence detection for up to eight DMRS sequence candidates. Additionally, or alternatively, the UE 120 may need to perform MIB decoding for the SSB index. These processes may result in delay and may require additional processing resources of the UE 120.

Techniques and apparatuses are described herein for SSB index detection. In some aspects, the UE 120 may receive an SSB offset indication that indicates a maximum timing offset between an SSB index of a first cell and an SSB index of a second cell. For example, the SSB offset indication may indicate that the maximum SSB offset is one SSB index or two SSB indexes. The UE 120 may perform SSB index detection based at least in part on the SSB offset indication. For example, the UE 120 may adjust an SSB index detection window based at least in part on the SSB offset indication.

As described above, when deriveSSB-IndexFromCell is not provided by the network, the UE 120 may need to decode the PBCH in order to determine the neighbor cell SSB index. This may result in delay and may require additional processing resources of the UE 120. Using the techniques and apparatuses described herein, the UE 120 may perform the SSB detection without decoding the PBCH. For example, the UE 120 may perform the SSB detection by performing PBCH DMRS detection for a number (e.g., three or five) SSB index candidates. Thus, the likelihood of delay and the number of processing resources needed may be reduced.

As indicated above, FIG. 5 is provided as an example. Other examples may differ from what is described with regard to FIG. 5.

Figure 6:
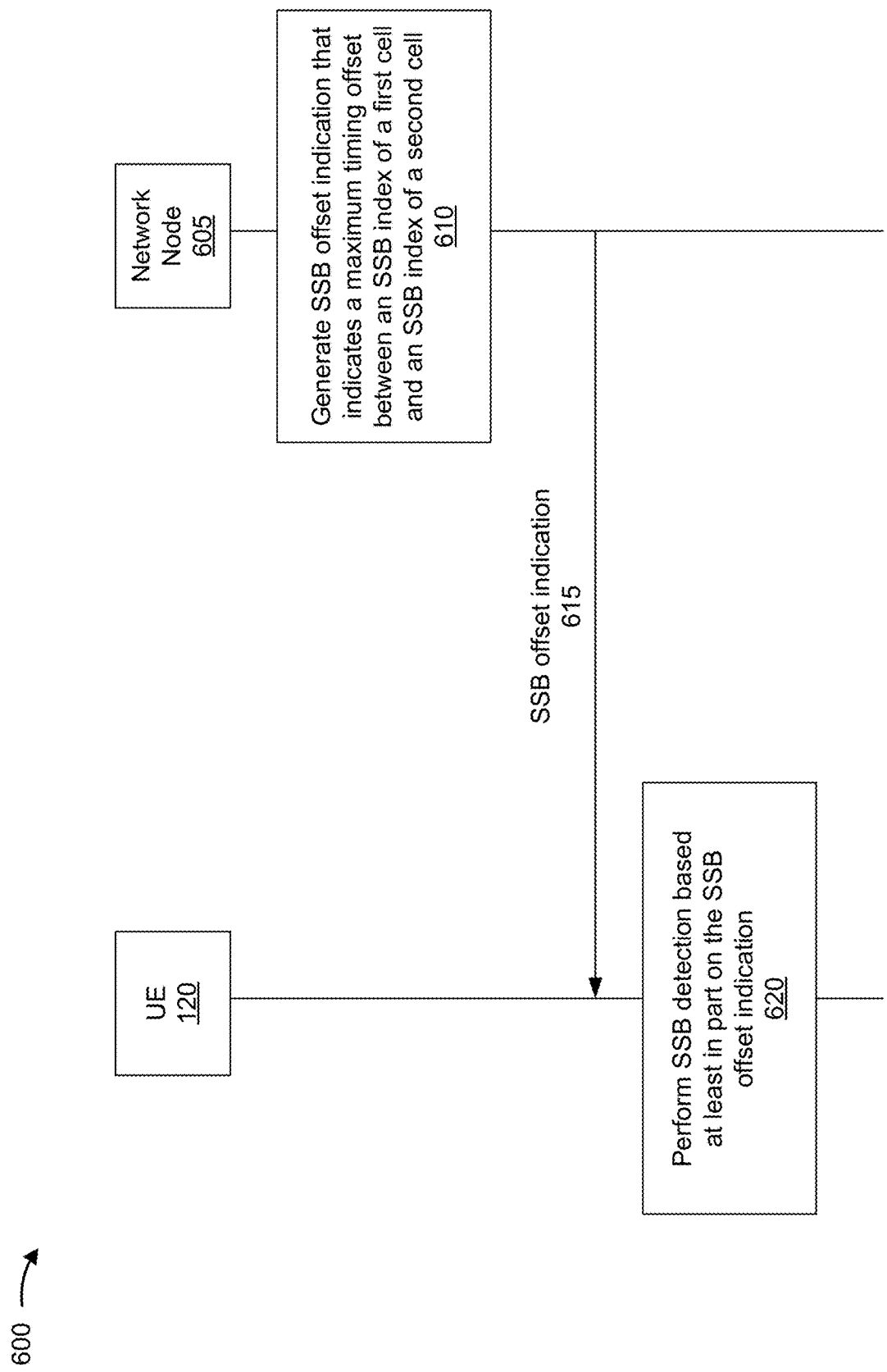
FIG. 6 is a diagram illustrating an example associated with SSB index detection, in accordance with the present disclosure.

FIG. 6 is a diagram illustrating an example 600 of SSB index detection, in accordance with the present disclosure. The UE 120 may communicate with a network node, such as the network node 605. The network node 605 may include some of all of the features of the base station 110 (e.g., the aggregated or disaggregated base station 110).

As shown in connection with reference number 610, the network node 605 may generate an SSB offset indication that indicates a maximum timing offset between an SSB index of a first cell and an SSB index of a second cell. In some aspects, the network node 605 may be associated with the first cell (e.g., may reside within the first cell). In some aspects, the first cell may be a serving cell and the second cell may be a neighbor cell or a target cell.

In some aspects, the SSB offset indication may be indicated by a number of SSB indexes.

In some aspects, the SSB offset indication may be indicated by the following: deriveSSB-IndexFromCell-n0-SSB-Indx. For example, the SSB offset indication may indicate that the synchronization between the SSB index of the first cell and the SSB index of the second cell is guaranteed up to zero SSB indexes. In other words, the SSB offset indication may indicate that SSB index of the first cell and the SSB index of the second cell are synchronized (e.g., perfectly synchronized).

In some aspects, the SSB offset indication may be indicated by the following: deriveSSB-IndexFromCell-n1-SSB-Indx. For example, the SSB offset indication may indicate that the synchronization between the SSB index of the first cell and the SSB index of the second cell is guaranteed up to one SSB index.

In some aspects, the SSB offset indication may be indicated by the following: deriveSSB-IndexFromCell-n2-SSB-Indx. For example, the SSB offset indication may indicate that the synchronization between the SSB index of the first cell and the SSB index of the second cell second cell is guaranteed up to two SSB indexes.

In some aspects, other SSB offset indications are possible. For example, with cell timing synchronization with up to nk SSB indexes, the UE 120 can assume that the SSB index of the second cell is aligned with the SSB index of the first cell for up to k SSB index offsets.

In some aspects, the SSB offset indication may indicate that the SSB index of the second cell is advanced or delayed by an amount that is less than or equal to the maximum timing offset.

In some aspects, the SSB offset indication may be indicated by a number of OFDM symbols.

In some aspects, the SSB offset indication may be indicated by the following: deriveSSB-IndexFromCell-n[k]-SSB-Indx. In this case, the synchronization from the perspective of the UE 120 is not larger than:

$$\operatorname{ceil}\left(\left(\frac{k}{2}\right)*X\right)+Y,$$

where:
X is the minimum number of OFDM symbols between the first symbol of SSB index P and the first symbol of SSB index P+1,
Y is a configurable offset (in terms of a number of OFDM symbols), and
k is the offset in SSB indexes (e.g., as indicated by the network).

In some aspects, the reference OFDM symbol length may be based at least in part on the serving cell's SSB SCS and/or the target measurement cell's SSB SCS.

In some aspects, the reference OFDM symbol length may be based at least in part on the smaller of the serving cell's SSB SCS and the target measurement cell's SSB SCS. For example, the reference OFDM symbol length may be represented as:
min(serving cell's SSB symbol length, target measurement cell's SSB symbol length).

In some aspects, the reference OFDM symbol length may be based at least in part on the larger of the serving cell's SSB SCS and the target measurement cell's SSB SCS. For example, the reference OFDM symbol length may be represented as:
max(serving cell's SSB symbol length, target measurement cell's SSB symbol length).

In some aspects, the network node 605 may determine the SSB offset indication based at least in part on an estimation of a maximum expected cell synchronization error at the UE 120. For example, the network node 605 may determine the SSB offset indication based at least in part on knowledge of the cell timing synchronization error between the first cell and the second cell. Additionally, or alternatively, the network node 605 may determine the SSB offset indication based at least in part on an expected propagation delay difference between target deployments (e.g., outdoor or indoor deployment).

In some aspects, the network node 605 may generate the SSB offset indication for a high SCS scenario (e.g., as described above in connection with FIG. 5). For example, the SSB offset indication may be generated for the 960 kHz SCS.

As shown in connection with reference number 615, the network node 605 may transmit, and the UE 120 may receive, the SSB offset indication. In some aspects, the network node 605 may transmit the SSB offset indication directly to the UE 120 (e.g., via unicast). For example, the SSB offset indication may be specific to the UE 120. In some aspects, the UE 120 may transmit the SSB offset indication to multiple UEs 120. For example, the SSB offset indication may be used by the multiple UEs 120 for performing SSB index detection. In some aspects, the network node 605 may broadcast the SSB offset indication. In some aspects, the network node 605 may transmit the SSB offset indication, to the UE 120 or the multiple UEs 120, via an RRC message, a MAC message (e.g., a MAC control element (MAC-CE)), or via downlink control information (DCI).

As shown in connection with reference number 620, the UE 120 may perform SSB index detection based at least in part on the SSB offset indication. In some aspects, the UE 120 may adjust an SSB index detection window based at least in part on the SSB offset indication. Additional details regarding the detection window (e.g., uncertainty window) are described below in connection with FIG. 7.

As described above, when the deriveSSB-IndexFromCell is not provided by the network, the UE 120 may determine the SSB index of the neighbor cell by decoding the PBCH. Decoding the PBCH may require DMRS sequence detection for up to eight DMRS sequence candidates. Additionally, or alternatively, the UE 120 may need to perform MIB decoding, which may result in additional delays and complexity.

In some aspects, when the deriveSSB-IndexFromCell-n0-SSB-Indx is provided by the network, the UE 120 can assume that the SSB index of the neighbor cell (e.g., the second cell) is aligned with the serving cell (e.g., the first cell). Thus, the UE 120 may be able to bypass the SSB index determination process.

In some aspects, when the deriveSSB-IndexFromCell-n1-SSB-Indx is provided by the network, the UE 120 may assume that there can be up to one SSB index misalignment between the serving cell and the neighbor cell. The UE 120 may use PBCH DMRS sequence detection to determine the SSB index of the neighbor cell among three neighbor cell SSB index candidates. For example, the UE 120 may use PBCH DMRS sequence detection to determine the SSB index of the neighbor cell among n−1, n, and n+1, wherein n is the SSB index of the serving cell.

In some aspects, when the deriveSSB-IndexFromCell-n2-SSB-Indx is provided by the network, the UE 120 may assume that there can be up to two SSB index misalignments between the serving cell and the neighbor cell. The UE 120 may use PBCH DMRS sequence detection to determine the SSB index of the neighbor cell among five neighbor cell SSB index candidates. For example, the UE 120 may use PBCH DMRS sequence detection to determine the SSB index of the neighbor cell among n−2, n−1, n, n+1, and n+2, wherein n is the SSB index of the serving cell.

In some aspects, other SSB offset indication values may be considered. For example, if the SSB offset indication indicates up to three SSB index misalignments between the serving cell and the neighbor cell, the UE 120 may use PBCH DMRS sequence detection to determine the SSB index of the neighbor cell among seven neighbor cell SSB candidates.

In some aspects, the UE 120 may identify one or more least significant bits of the SSB index based at least in part on the detected PBCH DMRS sequence.

In some aspects, when deriveSSB_IndexFromCell is enabled, there may be scheduling restriction(s) on the data symbols before and after the consecutive SSBs to be measured. For example, there may be a scheduling restriction on the data symbol before the consecutive SSBs to be measured, and a scheduling restriction on the data symbol after the consecutive SSBs to be measured. Alternatively, when deriveSSB_IndexFromCell is not enabled, there may be scheduling restriction(s) on all of the symbols during the SMTC window.

In some aspects, for the higher SCS (e.g., 480 kHz or 960 kHz), using the SSB offset indication may avoid the need for scheduling restrictions on all of the symbols during the SMTC window. For example, the scheduling restrictions may be reduced from the entire SMTC to $$\left(\frac{k}{2}\right)*X\right)+Y$$

symbols before and after the consecutive SSBs to be measured.

As described above, when deriveSSB-IndexFromCell is not provided by the network, the UE 120 may need to determine the neighbor cell SSB index by decoding the PBCH. This may result in delay and may require additional processing resources of the UE 120. Using the techniques and apparatuses described herein, the UE 120 may perform the SSB detection without decoding the PBCH. In some aspects, the UE 120 may perform the SSB detection by performing PBCH DMRS detection for a number of SSB index candidates. Thus, the likelihood of delay and the number of processing resources needed may be reduced.

As indicated above, FIG. 6 is provided as an example. Other examples may differ from what is described with regard to FIG. 6.

Figure 7:
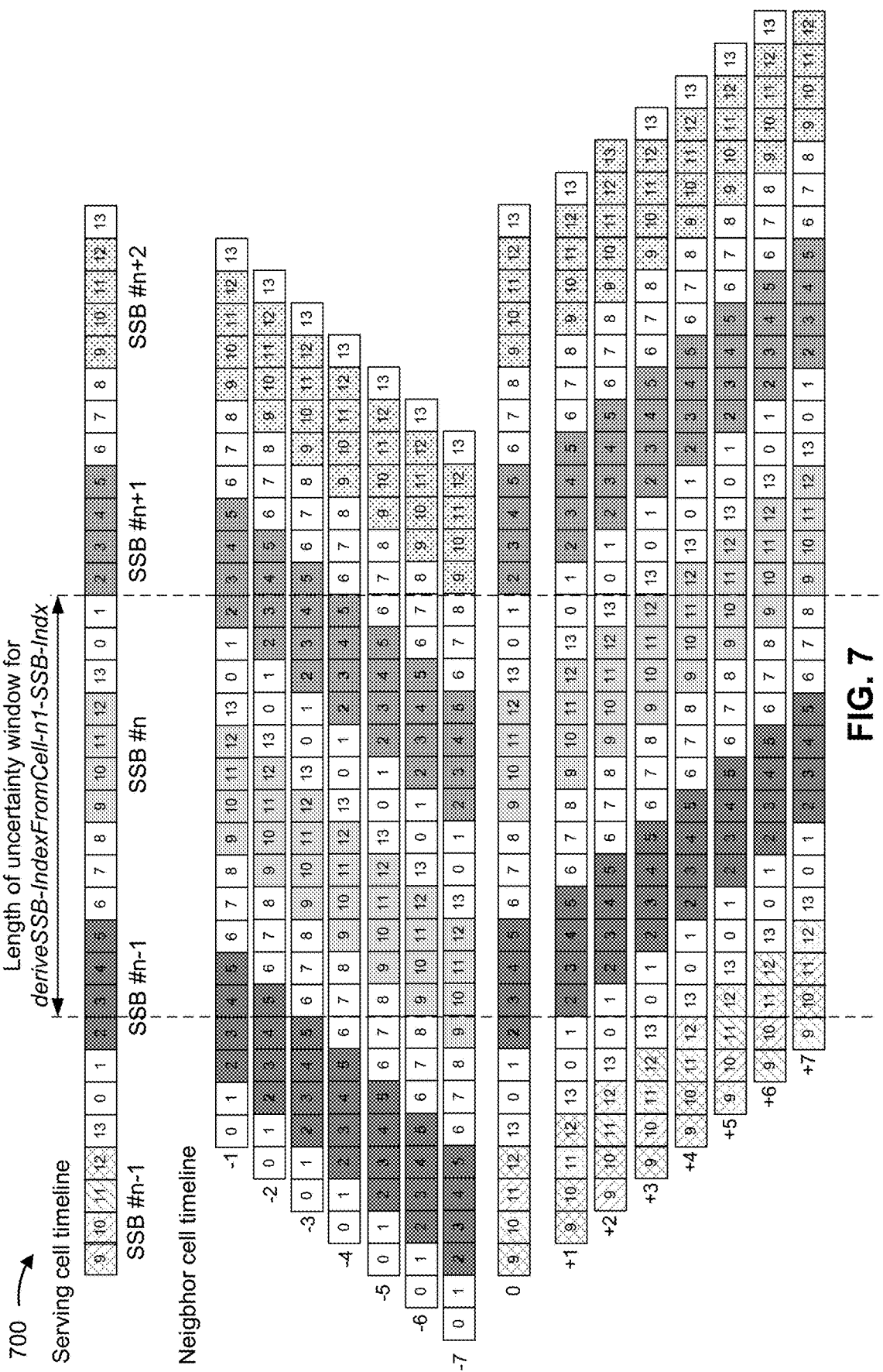
FIG. 7 is a diagram illustrating an example associated with an uncertainty window for SSB offset indication, in accordance with the present disclosure.

FIG. 7 is a diagram illustrating an example 700 of an uncertainty window for SSB offset indication, in accordance with the present disclosure. In some aspects, the UE 120 may detect an SSB from a neighbor cell (e.g., an intra-frequency neighbor cell). The SSB from the neighbor cell may be the SSB n. The deriveSSB-IndexFromCell-n1-SSB-Indx (e.g., the SSB offset indication) may indicate an uncertainty window of seven symbols. As shown in the example 700, the network may guarantee that the SSB index detected by the UE 120 cannot be any index other than n−1, n, or n+1 if the SSB detection window is within seven symbols of the SSB n. For example, if the SSB detection window is advanced by seven symbols or less, the UE 120 will not be detecting the SSB n−2. As described above, this reduces the likelihood of delay and the number of processing resources that are needed since the number of SSB index candidates is significantly reduced.

As indicated above, FIG. 7 is provided as an example. Other examples may differ from what is described with regard to FIG. 7.

Figure 8:
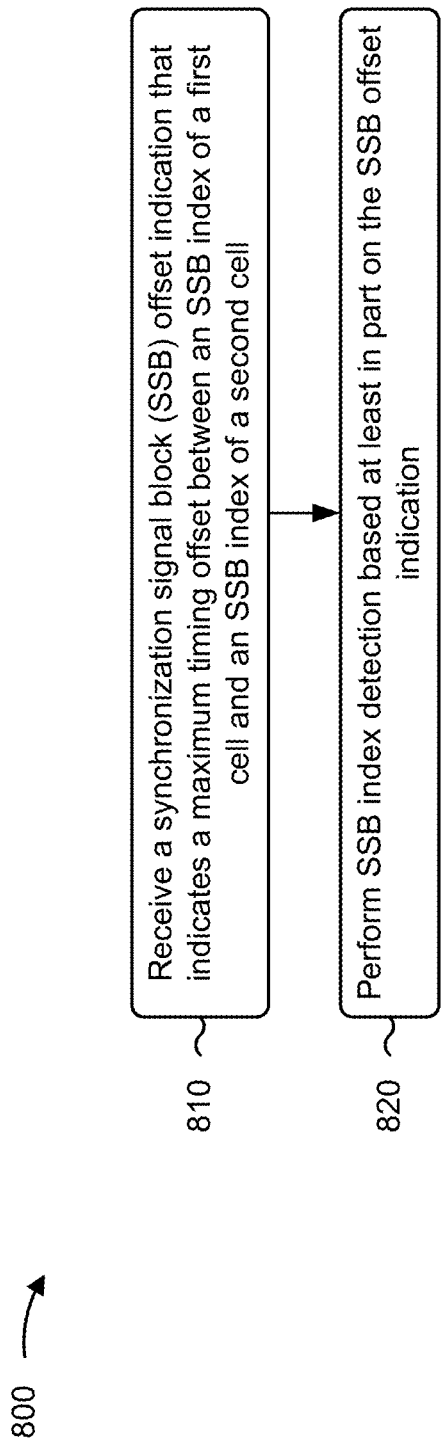
FIG. 8 is a diagram illustrating an example process associated with SSB index detection, in accordance with the present disclosure.

FIG. 8 is a diagram illustrating an example process 800 performed, for example, by a UE, in accordance with the present disclosure. Example process 800 is an example where the UE (e.g., UE 120) performs operations associated with SSB index detection.

As shown in FIG. 8, in some aspects, process 800 may include receiving an SSB offset indication that indicates a maximum timing offset between an SSB index of a first cell and an SSB index of a second cell (block 810). For example, the UE (e.g., using communication manager 140 and/or reception component 1002, depicted in FIG. 10) may receive a SSB offset indication that indicates a maximum timing offset between an SSB index of a first cell and an SSB index of a second cell, as described above.

As further shown in FIG. 8, in some aspects, process 800 may include performing SSB index detection based at least in part on the SSB offset indication (block 820). For example, the UE (e.g., using communication manager 140 and/or detection component 1008, depicted in FIG. 10) may perform SSB index detection based at least in part on the SSB offset indication, as described above.

Process 800 may include additional aspects, such as any single aspect or any combination of aspects described below and/or in connection with one or more other processes described elsewhere herein.

In a first aspect, performing the SSB index detection comprises adjusting an SSB index detection window based at least in part on the SSB offset indication.

In a second aspect, alone or in combination with the first aspect, the SSB offset indication indicates that the SSB index of the second cell is advanced or delayed by an amount that is less than or equal to the maximum timing offset.

In a third aspect, alone or in combination with one or more of the first and second aspects, the maximum timing offset is indicated by a maximum number of SSB indexes.

In a fourth aspect, alone or in combination with one or more of the first through third aspects, process 800 includes determining a maximum number of orthogonal frequency division multiplexing symbols between the SSB index of the first cell and the SSB index of the second cell based at least in part on the maximum number of SSB indexes.

In a fifth aspect, alone or in combination with one or more of the first through fourth aspects, the SSB offset indication indicates an offset of zero SSB indexes, and wherein performing the SSB index detection comprises determining that the SSB index of the second cell is aligned with the SSB index of the first cell.

In a sixth aspect, alone or in combination with one or more of the first through fifth aspects, the SSB offset indication indicates an offset of one SSB indexes, and wherein performing the SSB index detection comprises performing physical broadcast channel demodulation reference signal detection for three SSB index candidates.

In a seventh aspect, alone or in combination with one or more of the first through sixth aspects, the three SSB index candidates are a current SSB index of the first cell, a previous SSB index of the first cell, and a next SSB index of the first cell.

In an eighth aspect, alone or in combination with one or more of the first through seventh aspects, the SSB offset indication indicates an offset of two SSB indexes, and wherein performing the SSB index detection comprises performing physical broadcast channel demodulation reference detection for five SSB index candidates.

In a ninth aspect, alone or in combination with one or more of the first through eighth aspects, the five SSB index candidates are a current SSB index of the first cell, a previous two SSB indexes of the first cell, and a next two SSB indexes of the first cell.

In a tenth aspect, alone or in combination with one or more of the first through ninth aspects, performing the SSB index detection comprises performing the SSB index detection without decoding a physical broadcast channel.

In an eleventh aspect, alone or in combination with one or more of the first through tenth aspects, performing the SSB index detection comprises determining one or more least significant bits of one or more SSB index candidates.

In a twelfth aspect, alone or in combination with one or more of the first through eleventh aspects, the maximum timing offset is indicated by a maximum number of orthogonal frequency division multiplexing symbols.

In a thirteenth aspect, alone or in combination with one or more of the first through twelfth aspects, the SSB offset indication is specific to the UE, to a group of UEs that includes the UE, or to a cell associated with the UE.

In a fourteenth aspect, alone or in combination with one or more of the first through thirteenth aspects, receiving the SSB offset indication comprises receiving a broadcast message that includes the SSB offset indication.

In a fifteenth aspect, alone or in combination with one or more of the first through fourteenth aspects, receiving the SSB offset indication comprises receiving a radio resource control message, a medium access control message, or downlink control information that includes the SSB offset indication.

In a sixteenth aspect, alone or in combination with one or more of the first through fifteenth aspects, the first cell is a serving cell, and the second cell is a neighbor cell or a target cell for performing measurements.

In a seventeenth aspect, alone or in combination with one or more of the first through sixteenth aspects, the SSB offset indication indicates the maximum timing offset between the SSB index of the first cell and the SSB index of the second cell for high sub-carrier spacing.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
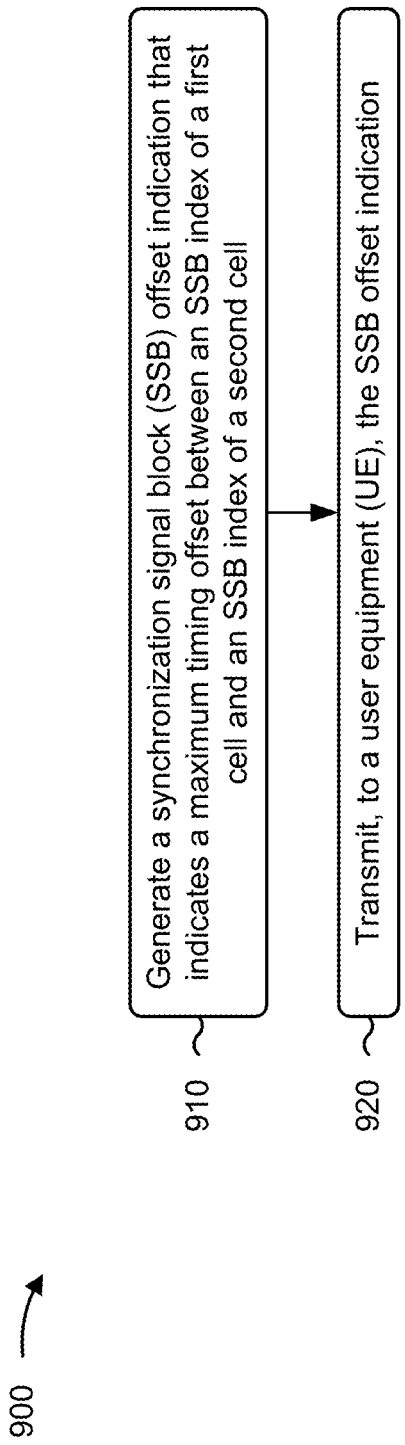
FIG. 9 is a diagram illustrating an example process associated with SSB offset indication and transmission, in accordance with the present disclosure.

FIG. 9 is a diagram illustrating an example process 900 performed, for example, by a network node, in accordance with the present disclosure. Example process 900 is an example where the network node (e.g., network node 605) performs operations associated with SSB offset indication and transmission.

As shown in FIG. 9, in some aspects, process 900 may include generating an SSB offset indication that indicates a maximum timing offset between an SSB index of a first cell and an SSB index of a second cell (block 910). For example, the network node (e.g., using communication manager 1108 and/or generation component 1110, depicted in FIG. 11) may generate a SSB offset indication that indicates a maximum timing offset between an SSB index of a first cell and an SSB index of a second cell, as described above.

As further shown in FIG. 9, in some aspects, process 900 may include transmitting, to a UE, the SSB offset indication (block 920). For example, the network node (e.g., using communication manager 1108 and/or transmission component 1104, depicted in FIG. 11) may transmit, to a UE, the SSB offset indication, as described above.

Process 900 may include additional aspects, such as any single aspect or any combination of aspects described below and/or in connection with one or more other processes described elsewhere herein.

In a first aspect, the network node resides in the first cell.

In a second aspect, alone or in combination with the first aspect, generating the SSB offset indication comprises generating the SSB offset indication based at least in part on a maximum expected cell synchronization error at the UE.

In a third aspect, alone or in combination with one or more of the first and second aspects, generating the SSB offset indication comprises generating the SSB offset indication based at least in part on a cell timing synchronization error between the first cell and the second cell.

In a fourth aspect, alone or in combination with one or more of the first through third aspects, generating the SSB offset indication comprises generating the SSB offset indication based at least in part on an expected propagation delay.

In a fifth aspect, alone or in combination with one or more of the first through fourth aspects, the SSB offset indication indicates that the SSB index of the second cell is advanced or delayed by an amount that is less than or equal to the maximum timing offset.

In a sixth aspect, alone or in combination with one or more of the first through fifth aspects, the maximum timing offset is indicated by a maximum number of SSB indexes.

In a seventh aspect, alone or in combination with one or more of the first through sixth aspects, the maximum timing offset is indicated by a maximum number of OFDM symbols.

In an eighth aspect, alone or in combination with one or more of the first through seventh aspects, the SSB offset indication is specific to the UE, to a group of UEs that includes the UE, or to a cell associated with the UE.

In a ninth aspect, alone or in combination with one or more of the first through eighth aspects, transmitting the SSB offset indication comprises transmitting a broadcast message that includes the SSB offset indication.

In a tenth aspect, alone or in combination with one or more of the first through ninth aspects, transmitting the SSB offset indication comprises transmitting a radio resource control message, a medium access control message, or downlink control information that includes the SSB offset indication.

In an eleventh aspect, alone or in combination with one or more of the first through tenth aspects, the first cell is a serving cell, and the second cell is a neighbor cell or a target cell for performing measurements.

In a twelfth aspect, alone or in combination with one or more of the first through eleventh aspects, the SSB offset indication indicates the maximum timing offset between the SSB index of the first cell and the SSB index of the second cell for high sub-carrier spacing.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
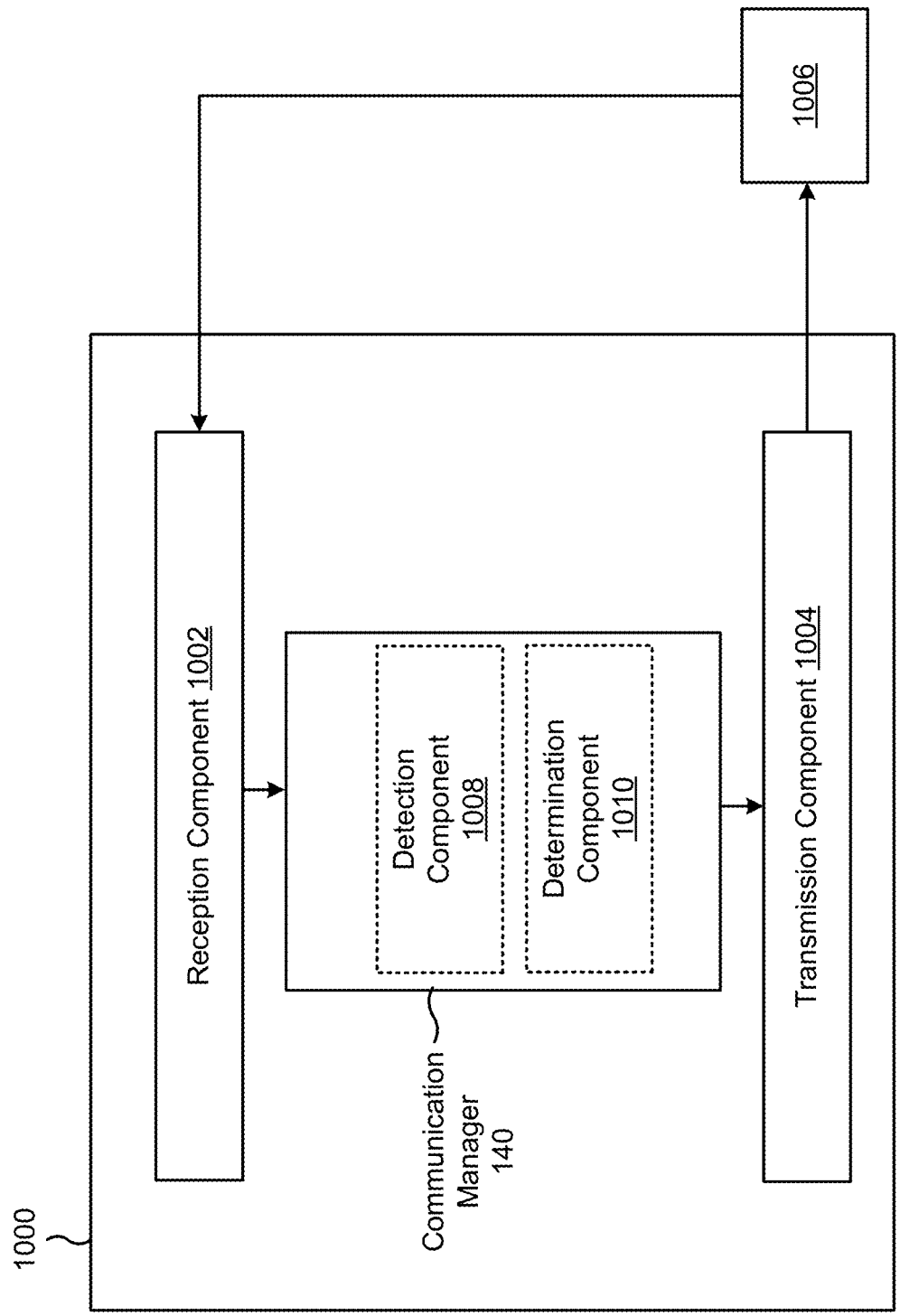
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a detection component 1008, a determination component 1010, among other examples.

In some aspects, the apparatus 1000 may be configured to perform one or more operations described herein in connection with FIGS. 6-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive a SSB offset indication that indicates a maximum timing offset between an SSB index of a first cell and an SSB index of a second cell. The detection component 1008 may perform SSB index detection based at least in part on the SSB offset indication.

The determination component 1010 may determine a maximum number of orthogonal frequency division multiplexing symbols between the SSB index of the first cell and the SSB index of the second cell based at least in part on the maximum number of SSB indexes.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
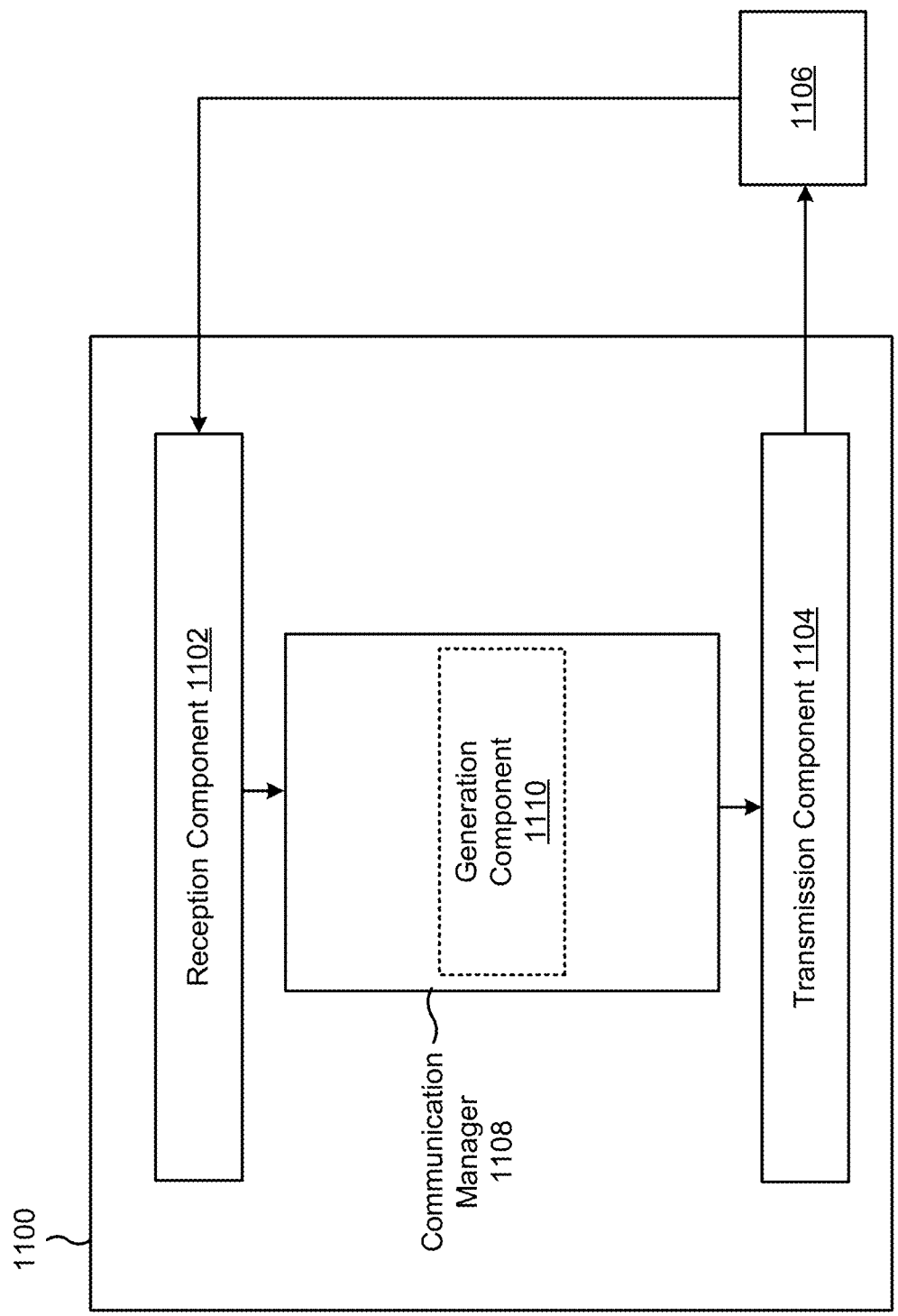
FIG. 11 is a diagram of an example apparatus for wireless communication, in accordance with the present disclosure.

FIG. 11 is a diagram of an example apparatus 1100 for wireless communication. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 1108. The communication manager 1108 may include some or all of the features of the communication manager 150. The communication manager 1108 may include a generation component 1110, among other examples.

In some aspects, the apparatus 1100 may be configured to perform one or more operations described herein in connection with FIGS. 6-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The generation component 1110 may generate a SSB offset indication that indicates a maximum timing offset between an SSB index of a first cell and an SSB index of a second cell. The transmission component 1104 may transmit, to a UE, the SSB offset indication.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving a synchronization signal block (SSB) offset indication that indicates a maximum timing offset between an SSB index of a first cell and an SSB index of a second cell; and performing SSB index detection based at least in part on the SSB offset indication.

Aspect 2: The method of Aspect 1, wherein performing the SSB index detection comprises adjusting an SSB index detection window based at least in part on the SSB offset indication.

Aspect 3: The method of any of Aspects 1-2, wherein the SSB offset indication indicates that the SSB index of the second cell is advanced or delayed by an amount that is less than or equal to the maximum timing offset.

Aspect 4: The method of any of Aspects 1-3, wherein the maximum timing offset is indicated by a maximum number of SSB indexes.

Aspect 5: The method of any of Aspects 1-4, wherein the SSB offset indication indicates an offset of zero SSB indexes, and wherein performing the SSB index detection comprises determining that the SSB index of the second cell is aligned with the SSB index of the first cell.

Aspect 6: The method of any of Aspects 1-5, wherein the SSB offset indication indicates an offset of one SSB indexes, and wherein performing the SSB index detection comprises performing physical broadcast channel demodulation reference signal detection for three SSB index candidates.

Aspect 7: The method of Aspect 6, wherein the three SSB index candidates are a current SSB index of the first cell, a previous SSB index of the first cell, and a next SSB index of the first cell.

Aspect 8: The method of any of Aspects 1-7, wherein the SSB offset indication indicates an offset of two SSB indexes, and wherein performing the SSB index detection comprises performing physical broadcast channel demodulation reference detection for five SSB index candidates.

Aspect 9: The method of Aspect 8, wherein the five SSB index candidates are a current SSB index of the first cell, a previous two SSB indexes of the first cell, and a next two SSB indexes of the first cell.

Aspect 10: The method of any of Aspects 1-9, wherein performing the SSB index detection comprises performing the SSB index detection without decoding a physical broadcast channel.

Aspect 11: The method of any of Aspects 1-10, wherein performing the SSB index detection comprises determining one or more least significant bits of one or more SSB index candidates.

Aspect 12: The method of any of Aspects 1-11, wherein the maximum timing offset is indicated by a maximum number of orthogonal frequency division multiplexing symbols.

Aspect 13: The method of any of Aspects 1-12, wherein the SSB offset indication is specific to the UE, to a group of UEs that includes the UE, or to a cell associated with the UE.

Aspect 14: The method of any of Aspects 1-13, wherein receiving the SSB offset indication comprises receiving a broadcast message that includes the SSB offset indication.

Aspect 15: The method of any of Aspects 1-14, wherein receiving the SSB offset indication comprises receiving a radio resource control message, a medium access control message, or downlink control information that includes the SSB offset indication.

Aspect 16: The method of any of Aspects 1-15, wherein the first cell is a serving cell, and the second cell is a neighbor cell or a target cell for performing measurements.

Aspect 17: The method of any of Aspects 1-16, wherein the SSB offset indication indicates the maximum timing offset between the SSB index of the first cell and the SSB index of the second cell for high sub-carrier spacing.

Aspect 18: A method of wireless communication performed by a network node, comprising: generating a synchronization signal block (SSB) offset indication that indicates a maximum timing offset between an SSB index of a first cell and an SSB index of a second cell; and transmitting, to a user equipment (UE), the SSB offset indication.

Aspect 19: The method of Aspect 18, wherein the network node resides in the first cell.

Aspect 20: The method of any of Aspects 18-19 wherein generating the SSB offset indication comprises generating the SSB offset indication based at least in part on a maximum expected cell synchronization error at the UE.

Aspect 21: The method of any of Aspects 18-20, wherein generating the SSB offset indication comprises generating the SSB offset indication based at least in part on a cell timing synchronization error between the first cell and the second cell.

Aspect 22: The method of any of Aspects 18-21, wherein generating the SSB offset indication comprises generating the SSB offset indication based at least in part on an expected propagation delay.

Aspect 23: The method of any of Aspects 18-22, wherein the SSB offset indication indicates that the SSB index of the second cell is advanced or delayed by an amount that is less than or equal to the maximum timing offset.

Aspect 24: The method of any of Aspects 18-23, wherein the maximum timing offset is indicated by a maximum number of SSB indexes.

Aspect 25: The method of any of Aspects 18-24, wherein the maximum timing offset is indicated by a maximum number of OFDM symbols.

Aspect 26: The method of any of Aspects 18-25, wherein the SSB offset indication is specific to the UE, to a group of UEs that includes the UE, or to a cell associated with the UE.

Aspect 27: The method of any of Aspects 18-26, wherein transmitting the SSB offset indication comprises transmitting a broadcast message that includes the SSB offset indication.

Aspect 28: The method of any of Aspects 18-27, wherein transmitting the SSB offset indication comprises transmitting a radio resource control message, a medium access control message, or downlink control information that includes the SSB offset indication.

Aspect 29: The method of any of Aspects 18-28, wherein the first cell is a serving cell, and the second cell is a neighbor cell or a target cell for performing measurements.

Aspect 30: The method of any of Aspects 18-29, wherein the SSB offset indication indicates the maximum timing offset between the SSB index of the first cell and the SSB index of the second cell for high sub-carrier spacing.

Aspect 31: An apparatus for wireless communication at a device, comprising a processor; memory coupled with the processor; and instructions stored in the memory and executable by the processor to cause the apparatus to perform the method of one or more of Aspects 1-17.

Aspect 32: A device for wireless communication, comprising a memory and one or more processors coupled to the memory, the one or more processors configured to perform the method of one or more of Aspects 1-17.

Aspect 33: An apparatus for wireless communication, comprising at least one means for performing the method of one or more of Aspects 1-17.

Aspect 34: A non-transitory computer-readable medium storing code for wireless communication, the code comprising instructions executable by a processor to perform the method of one or more of Aspects 1-17.

Aspect 35: A non-transitory computer-readable medium storing a set of instructions for wireless communication, the set of instructions comprising one or more instructions that, when executed by one or more processors of a device, cause the device to perform the method of one or more of Aspects 1-17.

Aspect 36: An apparatus for wireless communication at a device, comprising a processor; memory coupled with the processor; and instructions stored in the memory and executable by the processor to cause the apparatus to perform the method of one or more of Aspects 18-30.

Aspect 37: A device for wireless communication, comprising a memory and one or more processors coupled to the memory, the one or more processors configured to perform the method of one or more of Aspects 18-30.

Aspect 38: An apparatus for wireless communication, comprising at least one means for performing the method of one or more of Aspects 18-30.

Aspect 39: A non-transitory computer-readable medium storing code for wireless communication, the code comprising instructions executable by a processor to perform the method of one or more of Aspects 18-30.

Aspect 40: A non-transitory computer-readable medium storing a set of instructions for wireless communication, the set of instructions comprising one or more instructions that, when executed by one or more processors of a device, cause the device to perform the method of one or more of Aspects 18-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and one or more processors coupled to the memory, the one or more processors configured to:
  receive a synchronization signal block (SSB) offset indication that indicates a maximum timing offset between an SSB index of a first cell and an SSB index of a second cell; and
  perform SSB index detection based at least in part on the SSB offset indication.

2. The apparatus of claim 1, wherein the one or more processors, to perform the SSB index detection, are configured to adjust an SSB index detection window based at least in part on the SSB offset indication.

3. The apparatus of claim 1, wherein the SSB offset indication indicates that the SSB index of the second cell is advanced or delayed by an amount that is less than or equal to the maximum timing offset.

4. The apparatus of claim 1, wherein the maximum timing offset is indicated by a maximum number of SSB indexes.

5. The apparatus of claim 1, wherein the SSB offset indication indicates an offset of zero SSB indexes, and wherein performing the SSB index detection comprises determining that the SSB index of the second cell is aligned with the SSB index of the first cell.

6. The apparatus of claim 1, wherein the SSB offset indication indicates an offset of one SSB indexes, and wherein performing the SSB index detection comprises performing physical broadcast channel demodulation reference signal detection for three SSB index candidates.

7. The apparatus of claim 6, wherein the three SSB index candidates are a current SSB index of the first cell, a previous SSB index of the first cell, and a next SSB index of the first cell.

8. The apparatus of claim 1, wherein the SSB offset indication indicates an offset of two SSB indexes, and wherein performing the SSB index detection comprises performing physical broadcast channel demodulation reference detection for five SSB index candidates.

9. The apparatus of claim 8, wherein the five SSB index candidates are a current SSB index of the first cell, a previous two SSB indexes of the first cell, and a next two SSB indexes of the first cell.

10. The apparatus of claim 1, wherein the one or more processors, to perform the SSB index detection, are configured to perform the SSB index detection without decoding a physical broadcast channel.

11. The apparatus of claim 1, wherein the one or more processors, to perform the SSB index detection, are configured to determine one or more least significant bits of one or more SSB index candidates.

12. The apparatus of claim 1, wherein the maximum timing offset is indicated by a maximum number of orthogonal frequency division multiplexing symbols.

13. The apparatus of claim 1, wherein the SSB offset indication is specific to the UE, to a group of UEs that includes the UE, or to a cell associated with the UE.

14. The apparatus of claim 1, wherein the one or more processors, to receive the SSB offset indication, are configured to receive a broadcast message that includes the SSB offset indication.

15. The apparatus of claim 1, wherein the one or more processors, to receive the SSB offset indication, are configured to receive a radio resource control message, a medium access control message, or downlink control information that includes the SSB offset indication.

16. The apparatus of claim 1, wherein the first cell is a serving cell, and the second cell is a neighbor cell or a target cell for performing measurements.

17. An apparatus for wireless communication at a network node, comprising:
  a memory; and
  one or more processors coupled to the memory, the one or more processors configured to:
    generate a synchronization signal block (SSB) offset indication that indicates a maximum timing offset between an SSB index of a first cell and an SSB index of a second cell; and
    transmit, to a user equipment (UE), the SSB offset indication.

18. The apparatus of claim 17, wherein the network node resides in the first cell.

19. The apparatus of claim 17, wherein the one or more processors, to generate the SSB offset indication, are configured to generate the SSB offset indication based at least in part on a maximum expected cell synchronization error at the UE.

20. The apparatus of claim 17, wherein the one or more processors, to generate the SSB offset indication, are configured to generate the SSB offset indication based at least in part on a cell timing synchronization error between the first cell and the second cell.

21. The apparatus of claim 17, wherein the one or more processors, to generate the SSB offset indication, are configured to generate the SSB offset indication based at least in part on an expected propagation delay.

22. The apparatus of claim 17, wherein the SSB offset indication indicates that the SSB index of the second cell is advanced or delayed by an amount that is less than or equal to the maximum timing offset.

23. The apparatus of claim 17, wherein the maximum timing offset is indicated by a maximum number of SSB indexes.

24. The apparatus of claim 17, wherein the maximum timing offset is indicated by a maximum number of OFDM symbols.

25. The apparatus of claim 17, wherein the SSB offset indication is specific to the UE, to a group of UEs that includes the UE, or to a cell associated with the UE.

26. The apparatus of claim 17, wherein the one or more processors, to transmit the SSB offset indication, are configured to transmit a broadcast message that includes the SSB offset indication.

27. The apparatus of claim 17, wherein the one or more processors, to transmit the SSB offset indication, are configured to transmit a radio resource control message, a medium access control message, or downlink control information that includes the SSB offset indication.

28. The apparatus of claim 17, wherein the first cell is a serving cell, and the second cell is a neighbor cell or a target cell for performing measurements.

29. A method of wireless communication performed by a user equipment (UE), comprising:
  receiving a synchronization signal block (SSB) offset indication that indicates a maximum timing offset between an SSB index of a first cell and an SSB index of a second cell; and
  performing SSB index detection based at least in part on the SSB offset indication.

30. A method of wireless communication performed by a network node, comprising:
  generating a synchronization signal block (SSB) offset indication that indicates a maximum timing offset between an SSB index of a first cell and an SSB index of a second cell; and transmitting, to a user equipment (UE), the SSB offset indication.

\* \* \* \* \*